(12) United States Patent
Chen

(10) Patent No.: US 11,225,177 B2
(45) Date of Patent: Jan. 18, 2022

(54) VEHICLE CONSOLE ASSEMBLY

(71) Applicant: Ford Global Technologies, LLC, Dearborn, MI (US)

(72) Inventor: Shiran Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 16/548,184

(22) Filed: Aug. 22, 2019

(65) Prior Publication Data

US 2021/0053474 A1 Feb. 25, 2021

(51) Int. Cl.
*B60N 2/75* (2018.01)
*B60R 7/04* (2006.01)
*E05D 3/02* (2006.01)
*E05D 11/08* (2006.01)

(52) U.S. Cl.
CPC ............... *B60N 2/793* (2018.02); *B60R 7/04* (2013.01); *E05D 3/02* (2013.01); *E05D 11/08* (2013.01); *E05Y 2900/538* (2013.01)

(58) Field of Classification Search
CPC ........ B60N 2/793; B60N 2/753; B60N 2/767; B60R 7/04; E05D 3/02; E05D 11/08; E05Y 2900/538
USPC .................. 296/37.8, 24.34, 37.1, 1.09, 153
See application file for complete search history.

(56) References Cited

U.S. PATENT DOCUMENTS

| | | | | |
|---|---|---|---|---|
| 6,033,015 A | * | 3/2000 | Husted | B60N 2/793 297/188.19 |
| 8,046,875 B2 | * | 11/2011 | Wang | F16M 11/10 16/338 |
| 8,943,650 B2 | | 2/2015 | Anderson et al. | |
| 10,071,662 B2 | * | 9/2018 | Choi | E05F 1/1223 |
| 2009/0106938 A1 | * | 4/2009 | Mori | E05F 1/1215 16/277 |
| 2015/0267451 A1 | * | 9/2015 | Hirai | E05D 11/08 16/279 |

FOREIGN PATENT DOCUMENTS

| | | |
|---|---|---|
| EP | 0587014 B1 | 4/1996 |
| JP | 2006088849 A | 4/2006 |
| KR | 100622739 B1 | 9/2006 |

* cited by examiner

*Primary Examiner* — D Glenn Dayoan
*Assistant Examiner* — E Turner Hicks
(74) *Attorney, Agent, or Firm* — David Coppiellie; Price Heneveld LLP

(57) ABSTRACT

A vehicle console assembly includes a body that defines a cutout. The cut out includes a contact surface. A lid is operably coupled to the body and includes a connector that defines an engagement member. The lid is operable between a raised position, a lowered position, and an intermediate engaging position therebetween defined by a predefined opening angle. The engagement member is space-apart from the context surface when the lid is in the lowered position and engages the contact surface when the lid is in the intermediate engaging position. A biasing member is disposed proximate the connector. A hinge pin extends through the cutout, the biasing member, and the engagement member.

18 Claims, 13 Drawing Sheets

VEHICLE CONSOLE ASSEMBLY

FIELD OF THE DISCLOSURE

The present disclosure generally relates to a console assembly. More specifically, the present disclosure relates to a vehicle center console assembly.

BACKGROUND OF THE DISCLOSURE

Vehicles often have center consoles, including an armrest lid that allows occupants within the vehicles to rest their arms and access the center console. The armrest lid is typically coupled to the console bin by a hinge assembly. In this way, the armrest lid is operable between opened and closed positions.

SUMMARY OF THE DISCLOSURE

According to at least one aspect of the present disclosure, a vehicle console assembly includes a body that defines a cutout. The cutout includes a contact surface. A lid is operably coupled to the body and includes a connector that defines an engagement member. The lid is operable between a raised position, a lowered position, and an intermediate engaging positioned therebetween defined by a predefined opening angle. The engagement member is space-apart from the context surface when the lid is in the lowered position and engages the contact surface when the lid is in the intermediate engaging position. A biasing member is disposed proximate the connector. A hinge pin extends through the cutout, the biasing member, and the engagement member.

According to another aspect of the present disclosure, a console assembly for a vehicle includes a body. The body includes a support extension that extends outward from an upper portion of the body. The support extension defines a cutout that has a contact surface. A lid includes an engagement member positioned within the cutout. The engagement member is operable between an engaged position and a disengaged position. A hinge pin is operably coupled to the body and the lid. The lid rotates about the hinge pin and is operable between a raised position, a lowered position, and an intermediate engaging position therebetween.

According to another aspect of the present disclosure, a console assembly includes a body that includes a first support extension that defines a first cutout on a first inner surface thereof and a second support extension that defines a second cutout on a second inner surface thereof. The first cutout includes a first contact surface and the second cutout includes a second contact surface. A lid includes a connector that extends from a lower surface of the lid. The connector defines a first engagement member and a first outer surface thereof and a second engagement member and a second outer surface thereof. The first and second engagement members are positioned within the first and second cutouts and configured to engage the first and second contact services, respectively.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
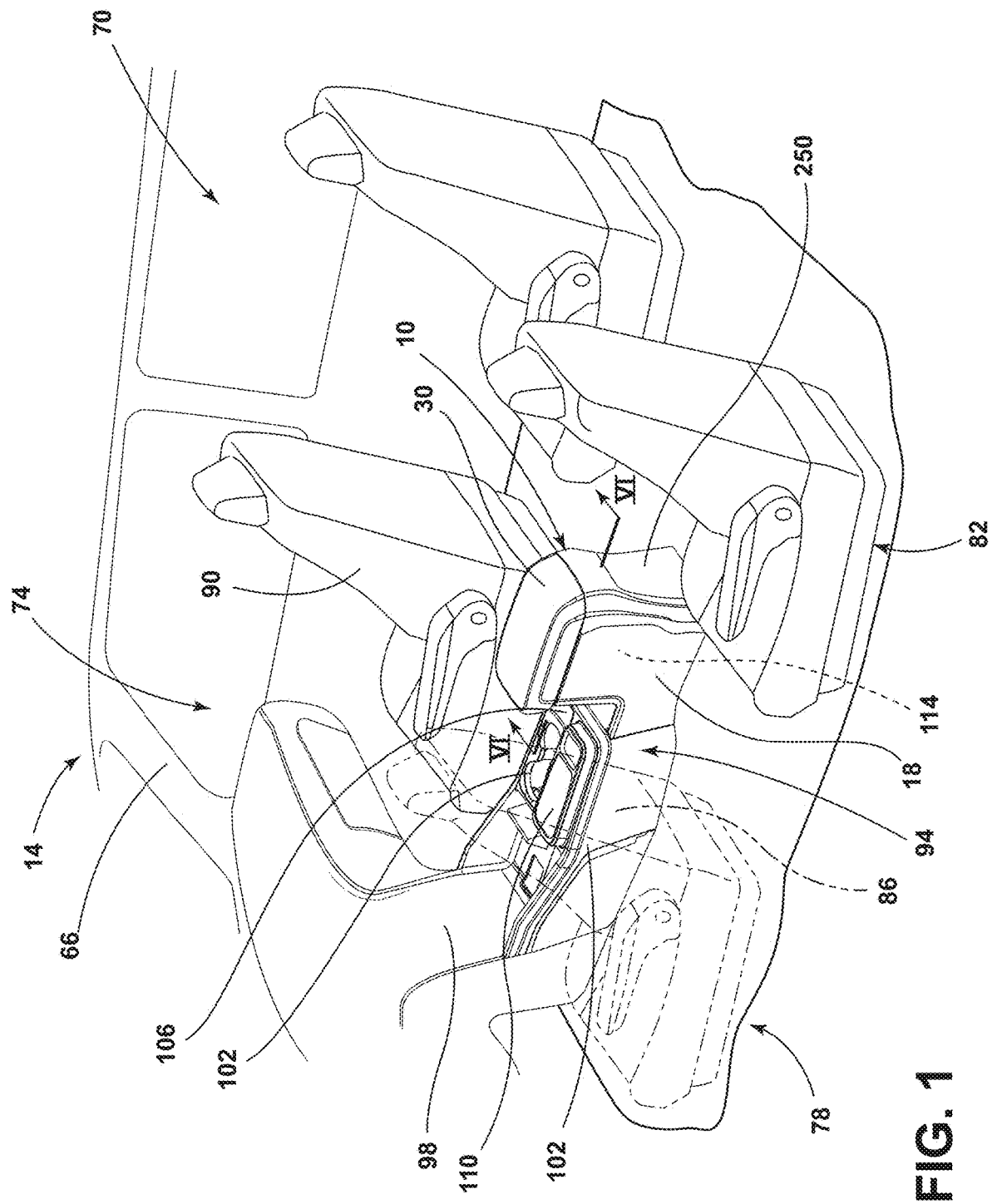
FIG. 1 is a side perspective view of a passenger compartment of a vehicle, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-13, reference numeral 10 generally refers to a console assembly for a vehicle 14 that has a body 18 defining a cutout 22. The cutout 22 includes a contact surface 26. A lid 30 is operably coupled to the body 18 and includes a connector 34 that defines an engagement member 38. The lid 30 is operable between a raised position 42, a lowered position 46, and an intermediate engaging position 50 therebetween defined by a predefined opening angle 54. The engagement member 38 is spaced-apart from the contact surface 26 when the lid 30 is in the lowered position 46 and engages the contact surface 26 when the lid 30 is in the intermediate engaging position 50. A biasing member 58 is disposed proximate the connector 34. A hinge pin 62 extends through a cutout 22, the biasing member 58, and the engagement member 38.

Referring to FIG. 1, the vehicle 14 includes a vehicle body 66, which defines an interior 70 of the vehicle 14 having a passenger compartment 74 therein. The passenger compartment 74 may include a first seating row 78 and a second seating row 82. Fewer or more seating rows may be included in the vehicle 14 without departing from the teachings herein. The first seating row 78 may include a driver seat 86 and a passenger seat 90. The driver and passenger seats 86, 90 may be separated by the console assembly 10. The console assembly 10 may include the body 18 and a cup holder assembly 94. The cup holder assembly 94 may extend between the body 18 and an instrument panel 98 of the vehicle 14. The cup holder assembly 94 may define one or more cup wells 102 and/or one or more receiving wells 106 for receiving other objects, such as electronics, keys, etc. The cup holder assembly 94 may also define one or more apertures 110 for receiving various controls for the vehicle 14.

While the vehicle 14, as is illustrated in FIG. 1, has the console assembly 10 between the driver seat 86 and the passenger seat 90 of the first seating row 78, it is contemplated that the console assembly 10 may be positioned in any practicable location within the passenger compartment 74 of the vehicle 14 without departing from the teachings herein. Additionally or alternatively, the console assembly 10 is illustrated as a center console. However, the console assembly 10 may be any console or compartment within the vehicle 14 without departing from the teachings herein.

In various examples, the vehicle 14 is a wheeled motor vehicle 14, which may be a sedan, a sport utility vehicle, a truck, a van, a crossover, and/or other styles of the vehicle 14. The vehicle 14 may be a manually operated vehicle 14 (e.g., with a human driver), a fully autonomous vehicle 14 (e.g., no human driver), or a partially autonomous vehicle 14 (e.g., may be operated with or without a human driver). Additionally, the vehicle 14 may be utilized for personal and/or commercial purposes, such as ride-providing services (e.g., chauffeuring) and/or ride-sharing services.

Figure 2:
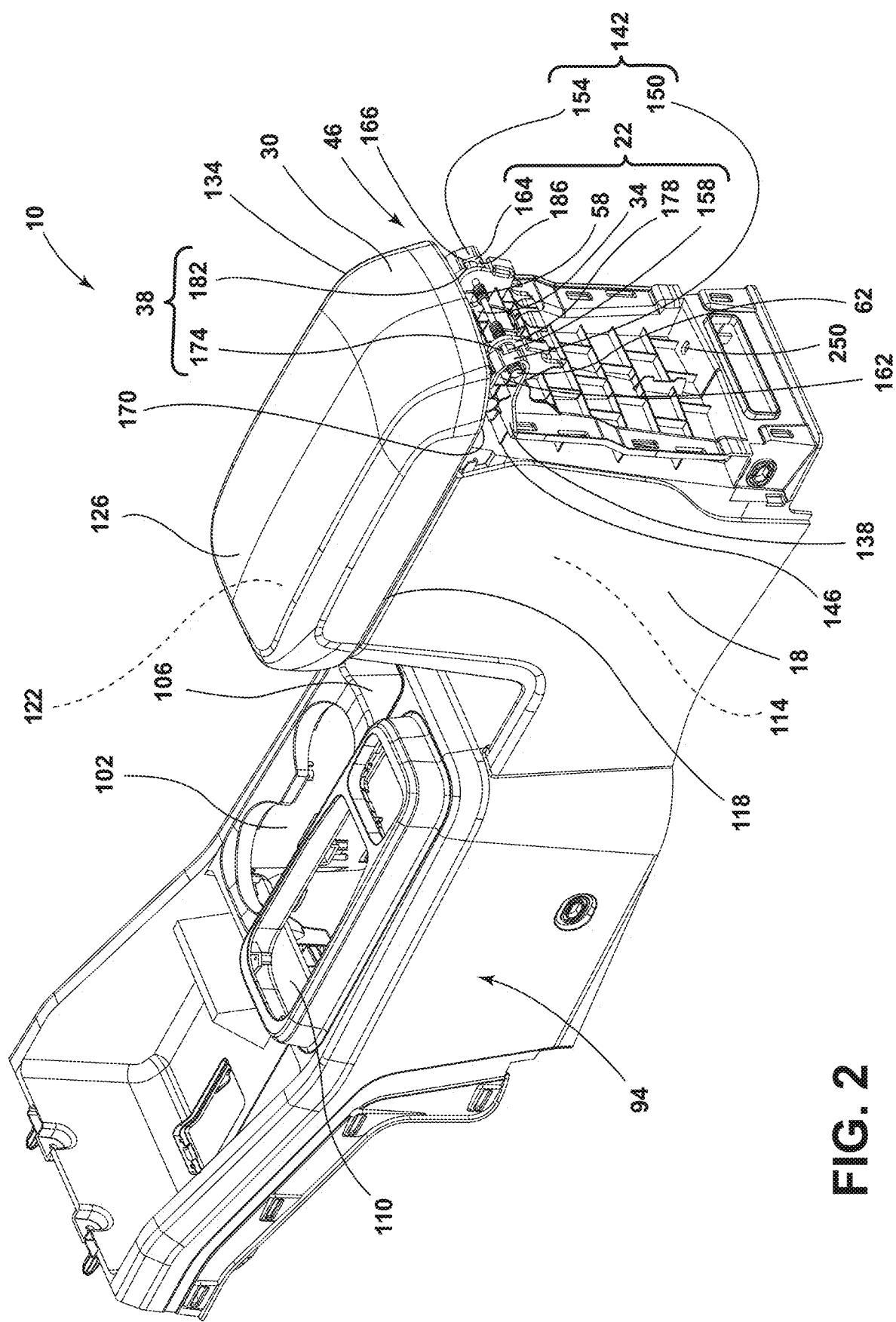
FIG. 2 is a side perspective view of a console assembly for a vehicle, according to one example.

Referring to FIG. 2, the console assembly 10 includes the body 18, which may define an inner cavity 114 for providing storage space to occupants of the vehicle 14 (FIG. 1). The body 18 may include an upper rim 118 defining an opening 122, which may provide access to the inner cavity 114. The opening 122 may define a substantially rectangular shape, which may correspond with a substantially rectangular cross-sectional shape of the body 18. It is also contemplated that the body 18 may have any practical shape. Additionally or alternatively, the cup holder assembly 94 and/or the body 18 may be any practicable size, depending on the vehicle 14. When in the lowered position 46, the lid 30 may rest upon and/or be supported by the upper rim 118 of the body. 18. In this way, the lid 30 may be disposed over the opening 122 of the inner cavity 114. According to various aspects, the lid 30 may include a cover 126 coupled to the lid 30. The cover 126 may be, for example, a padded layer, a cushion layer, and/or a decorative layer. This configuration may be advantageous for providing an armrest to the occupants of the vehicle 14 positioned within the driver seat 86 and/or the passenger seat 90 (FIG. 1). Further, when in the lowered position 46, the lid 30 may not interfere with access to the cup wells 102 and/or the receiving wells 106 of the cup holder assembly 94.

Figure 3:
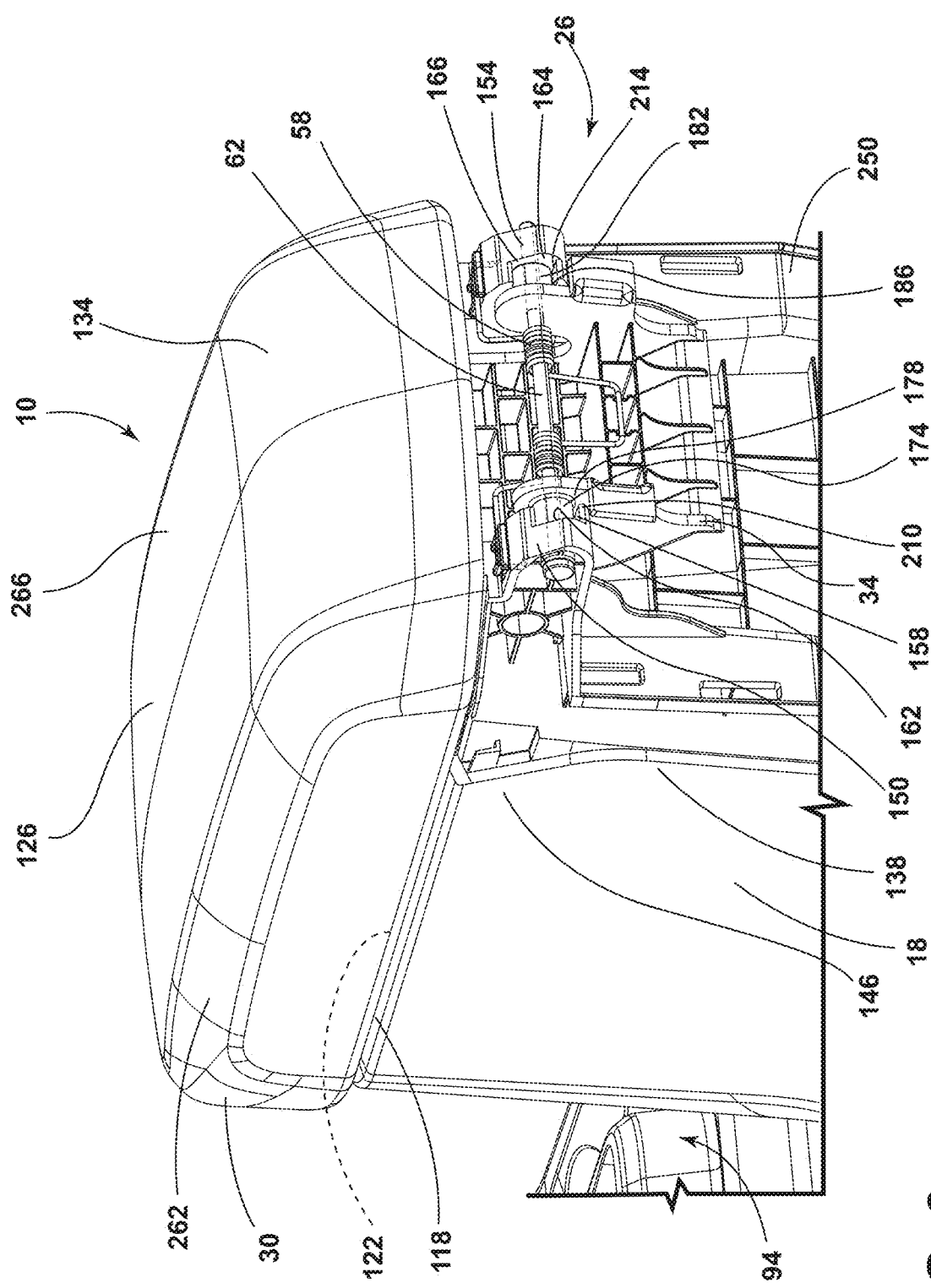
FIG. 3 is a partial rear perspective view of a console assembly for a vehicle, according to one example.

Referring to FIGS. 2 and 3, a first portion 134 of the lid 30 may be coupled to a first end 138 of the body 18. In various examples, the first portion 134 of the lid 30 and the first end 138 of the body 18 may be vehicle-rearward portions of the console assembly 10. This configuration may allow an occupant of the vehicle 14 to open the console assembly 10 from a vehicle-forward portion of the console assembly 10. Additionally or alternatively, the lid 30 may be coupled to the body 18 on a side or a front of the console assembly 10 to allow the occupant to open the console assembly 10 from a different orientation.

The body 18 may include a support extension 142 extending outward from an upper portion 146 of the body 18 at the first end 138. The support extension 142 may extend in a vehicle-rearward direction from the body 18. According to various aspects, the body 18 may include a first support extension 150 and a second support extension 154. The first and second support extensions 150, 154 may be substantially mirror images of one another. Further, the first and second support extensions 150, 154 may be spaced-apart and arranged parallel to one another at the first end 138 of the body 18. The first support extension 150 may define a first cutout 158 on a first inner surface 162 thereof. Additionally or alternatively, the second support extension 154 may define a second cutout 164 on a second inner surface 166 thereof. In this way, the first and second cutouts 158, 164 may be oriented inward towards one another.

In various examples, the lid 30 may include the connector 34 extending from a lower surface 170 thereof. The connector 34 may define a first engagement member 174 on a first outer surface 178 and a second engagement member 182 on a second outer surface 186. The first and second outer surfaces 178, 186 of the connector 34 may be opposing surfaces, such that the first and second engagement members 174, 182 may extend outwards, away from one another.

Referring still to FIGS. 2 and 3, when assembled, the lid 30 may be operably coupled to the body 18. According to various aspects, the first engagement member 174 may be positioned within the first cutout 158 of the first support extension 150. Similarly, the second engagement member 182 may be positioned within the second cutout 164 of the second support extension 154. The hinge pin 62 may extend through the first and second support extensions 150, 154 (e.g., through the first and second cutouts 158, 164) and the first and second engagement members 174, 182. In this way, the hinge pin 62 may couple the lid 30 to the body 18.

Figure 10:
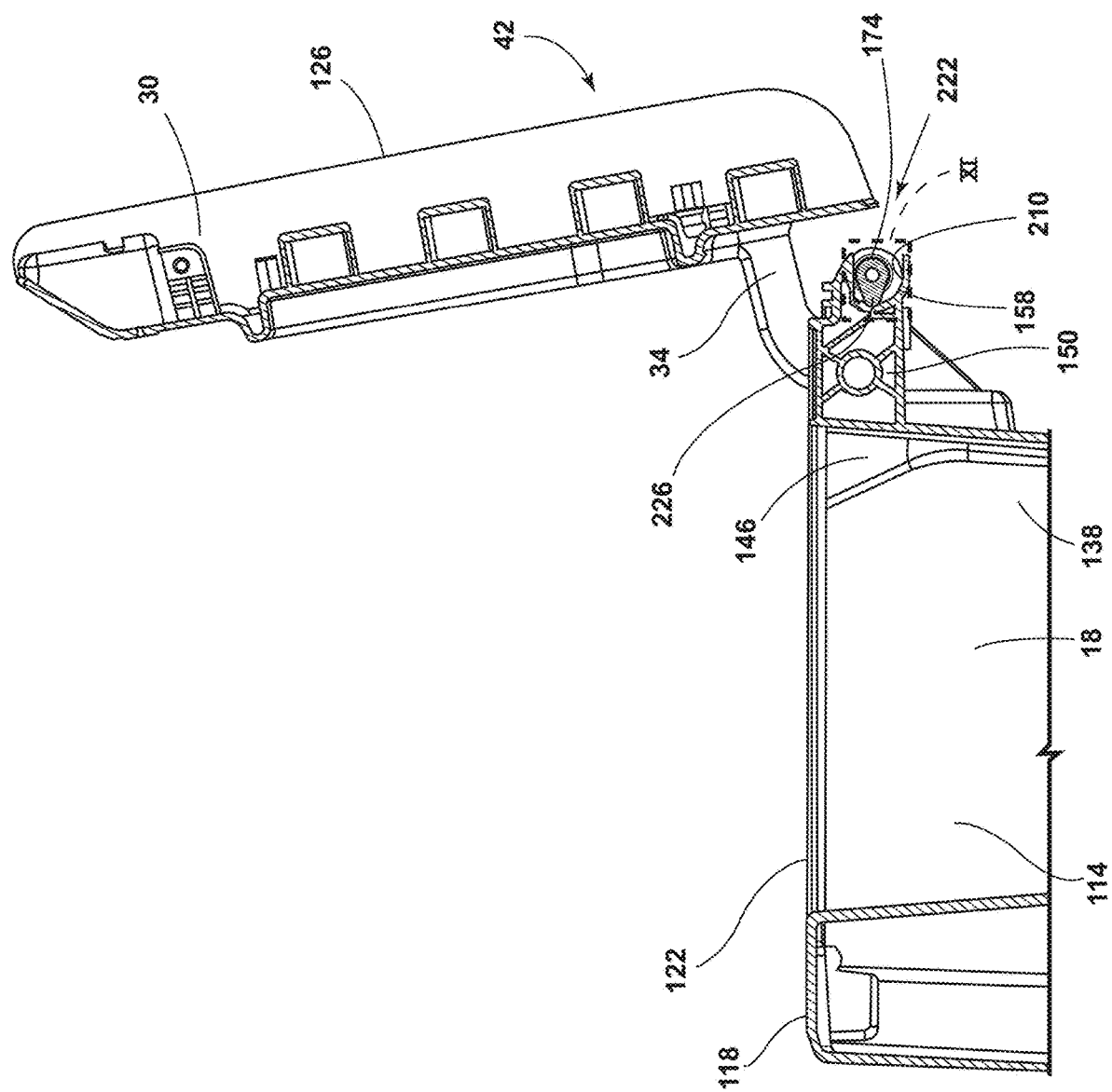
FIG. 10 is a cross-sectional view of a console assembly with a lid in a raised position of FIG. 1, taken along line VI-VI.

Moreover, in various examples, the hinge pin 62 may define a rotational axis of the lid 30. Stated differently, the lid 30 may rotate about the hinge pin 62 between the lowered position 46 and the raised position 42 (FIG. 10). In various examples, the console assembly 10 may include the biasing member 58 disposed proximate the connector 34. The biasing member 58 may be disposed between the first and second engagement members 174, 182. In a non-limiting example, as illustrated in FIG. 3, the biasing member 58 may be a double torsion spring. In such examples, the biasing member 58 may be configured as a double torsion spring that may experience maximum tension when the lid 30 is in the lowered position 46. As such, the biasing member 58 may bias the lid 30 toward the raised position 42 (FIG. 10). In various examples, the biasing member 58 may be operably coupled to the hinge pin 62. In this way the hinge pin 62 may extend through the biasing member 58. Further, while the biasing member 58 is illustrated as a double torsion spring, it is contemplated that the biasing member 58 may be any practicable biasing member 58, such as, for example, springs, magnets, clock springs, or any other similar biasing device.

Figure 4:
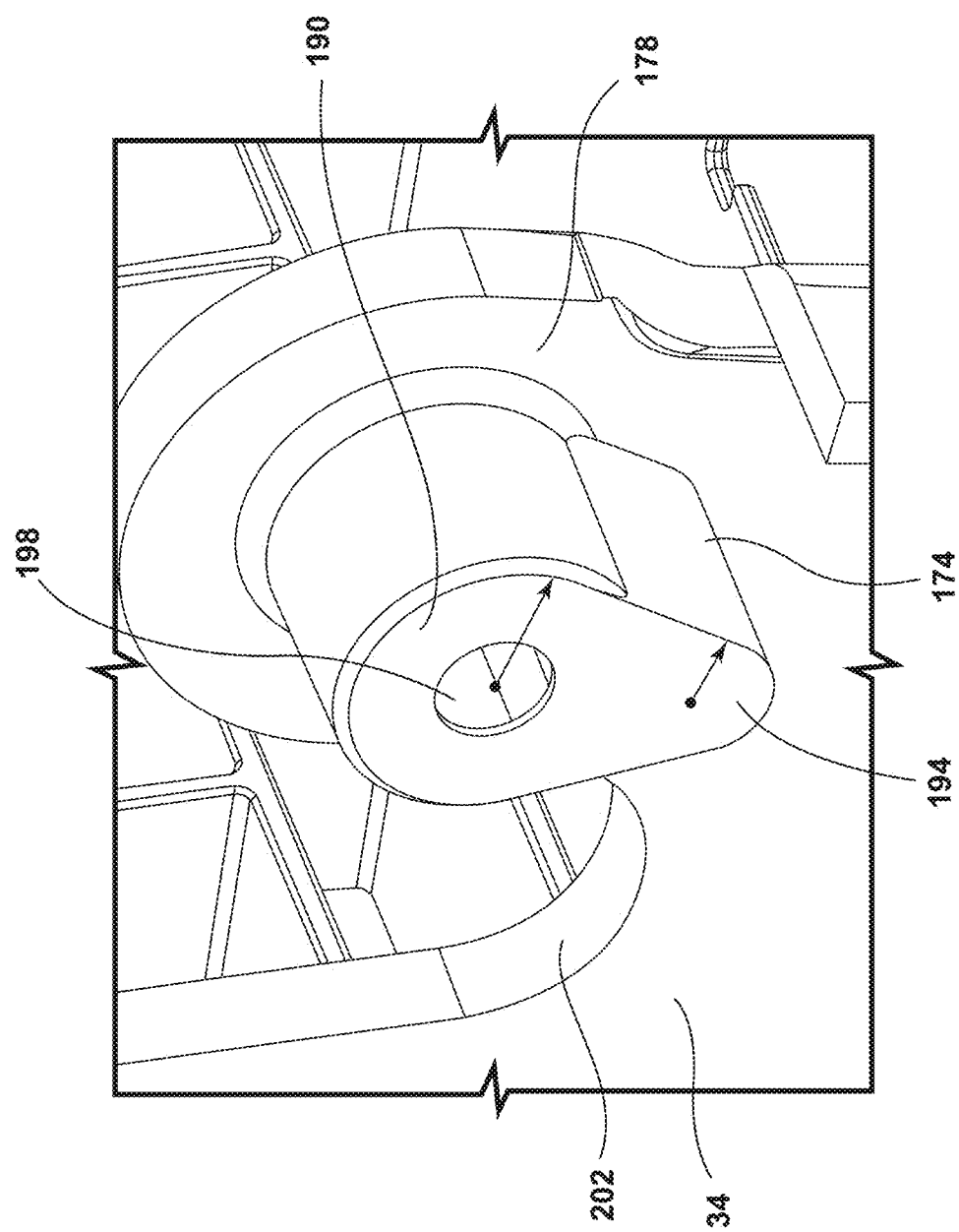
FIG. 4 is an enlarged side perspective view of an engagement member of the lid of the console assembly, according to one example.

Referring to FIG. 4, the first engagement member 174 is illustrated extending from the first outer surface 178 of the connector 34. In various examples, the first engagement member 174 may define a substantially teardrop cross-sectional shape. In this way, the first engagement member 174 may be defined by a first portion 190 having a first radius $r_1$ and a second portion 194 having a second radius $r_2$. In various examples, the first and second portions 190, 194 of the first engagement member 174 may be substantially circular portions coupled together to form the teardrop shape. The first radius $r_1$ may be greater than the second radius $r_2$. According to various aspects, the ratio between the first radius $r_1$ and the second radius $r_2$ may be about 2:1. Stated differently, the first radius $r_1$ may be about twice the size of the second radius $r_2$. This configuration may be advantageous for the first engagement member 174 to frictionally engage the body 18 (FIG. 1). In this way, the first engagement member 174 may counteract a biasing force of the biasing member 58 as the lid 30 rotates. As illustrated in FIG. 4, the first engagement member 174 may define a hole 198 for receiving the hinge pin 62 (FIG. 3). The first engagement member 174, the connector 34, and the lid 30 may rotate about the hinge pin 62 received within the hole 198.

Referring still to FIG. 4, the connector 34 may define a U-shaped groove 202 proximate the first engagement member 174. This may allow the first engagement member 174 to rotate within the first cutout 158 (FIG. 3) with minimal or no interference by the connector 34. While the first engagement member 174 is illustrated in FIG. 4, it is contemplated that the second engagement member 182 may be similarly configured. Further, the connector 34 may also define the U-shaped groove 202 proximate the second engagement member 182. The first and second engagement members 174, 182 defined by the first and second outer surfaces 178, 186 may be substantially mirror images of one another. This configuration may be advantageous to provide for substantially equal rotation of the lid 30 proximate both the first and second engagement members 174, 182.

Figure 5:
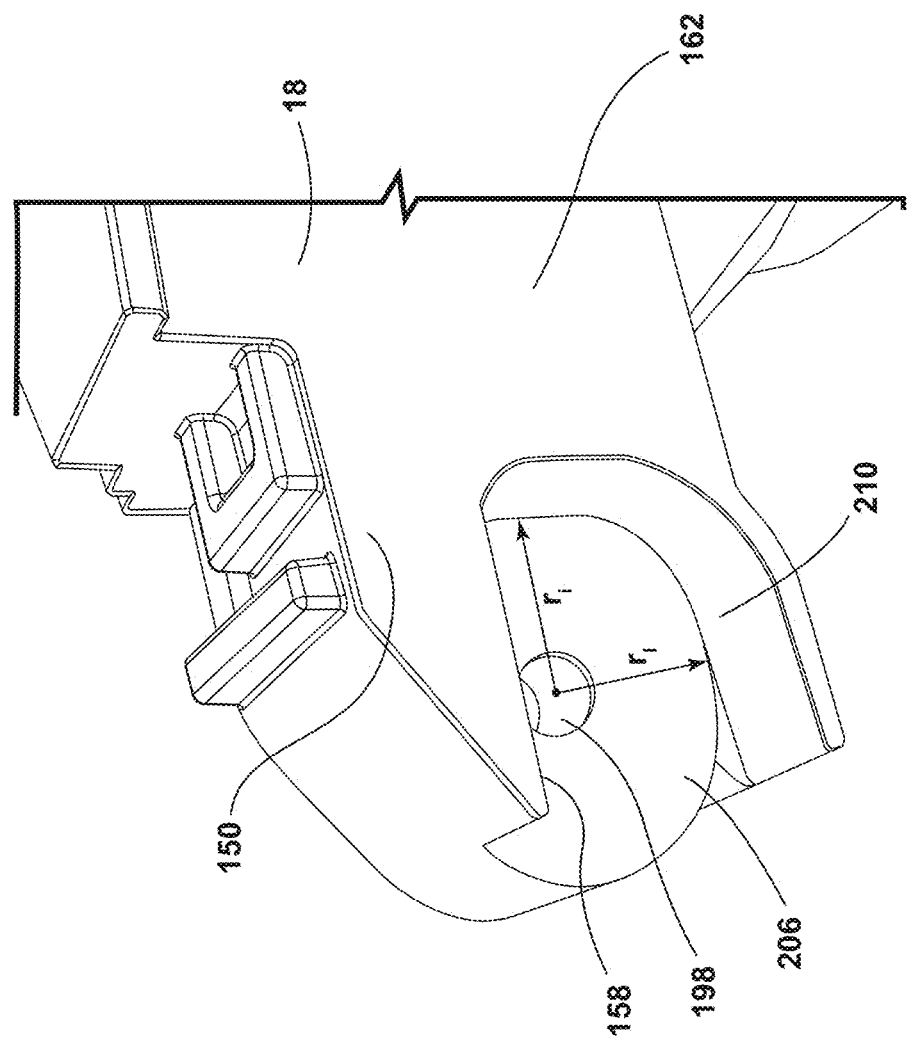
FIG. 5 is an enlarged side perspective view of a cutout of a support extension of a console assembly, according to one example.

Referring to FIG. 5, the first cutout 158 may be defined by the first inner surface 162 of the first support extension 150 of the body 18. The first cutout 158 may be configured as a C-shaped channel. This may allow for the first engagement member 174 (FIG. 3) to rotate within the first cutout 158. The first support extension 150 may include an abutting surface 206 proximate the first cutout 158. The first engagement member 174 (FIG. 3) may abut the abutting surface 206 when assembled with the body 18. In various examples, the first cutout 158 may not define a substantially same radius between the hole 198 for the hinge pin 62 (FIG. 3) and a first contact surface 210. An inner radius $r_i$ between the hole 198 and the first contact surface 210 may be less than a lower radius $r_l$ between the hole 198 and the first contact surface 210. In various examples, the inner radius $r_i$ may be a substantially horizontal radius extending from the hole 198 in a vehicle-forward direction to the first contact surface 210. The lower radius $r_l$ may be a substantially vertical line extending between the hole 198 and the first contact surface 210. In this way, the inner radius $r_i$ may be substantially perpendicular to the lower radius $r_l$. The first contact surface 210 may form a substantially continuous curved surface. It is contemplated that the second cutout 164 of the second support extension 154 may be similarly configured. In this way, the second cutout 164 may include a second contact surface 214 configured to engage the second engagement member 182. Moreover, the second engagement member 182 may abut the abutting surface 206 of the second cutout 164 when assembled.

Referring to FIGS. 3-5, when assembled, the first and second engagement members 174, 182 may be disposed within the first and second cutouts 158, 164, respectively. The first engagement member 174 may be configured to engage the first contact surface 210 of the first cutout 158.

Similarly, the second engagement member 182 may be configured to engage the second contact surface 214 of the second cutout 164.

Referring to FIGS. 3 and 6-11, the lid 30 may be operable between the raised position 42 (FIG. 10), the lowered position 46 (FIG. 6), and the intermediate engaging position 50 (FIG. 8) therebetween. As the lid 30 rotates, the first and second engagement members 174, 182 may rotate between disengaged positions 218 and engaged positions 222. When in the disengaged positions 218, a distal end 226 of each of the first and second engagement members 174, 182 may be spaced-apart from the first and second contact surfaces 210, 214, respectively. When in the engaged positions 222, the distal ends 226 of the first and second engagement members 174, 182 may contact and/or engaged the first and second contact surfaces 210, 214 of the first and second cutouts 158, 164, respectively. The distal ends 226 may frictionally engage with the first and second contact surfaces 210, 214, respectively, when in the engaged positions 222. In this way, the first and second engagement members 174, 182 may provide a frictional interference between the lid 30 and the body 18, as the lid 30 rotates between the raised and lowered positions 42, 46. This configuration may be advantageous to counteract the biasing force of the biasing member 58.

According to various aspects, the biasing member 58 may bias the lid 30 toward the raised position 42. In various examples, the console assembly 10 may include a latch assembly 230 retaining the lid 30 in the lowered position 46. When the occupant of the vehicle 14 disengages the latch assembly 230, the biasing force of the biasing member 58 may operate to rotate the lid 30 from the lowered position 46 to the raised position 42. The distal ends 226 of the first and second engagement members 174, 182 may engage the first and second contact surfaces 210, 214 to produce the frictional interference, which may slow the rotation of the lid 30 to the raised position 42.

Figure 6:
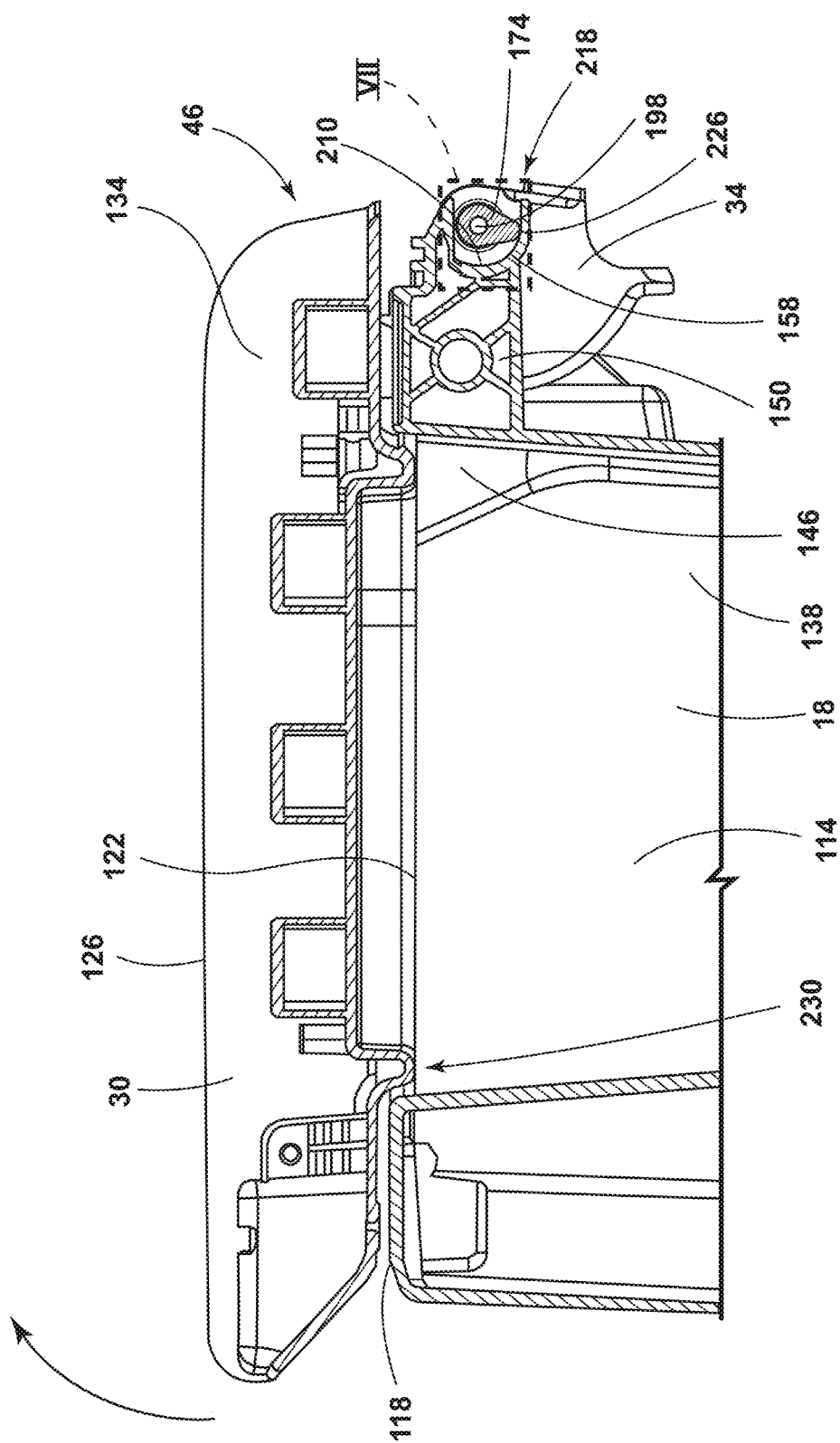
FIG. 6 is a cross-sectional view of a console assembly with a lid in a lowered position of FIG. 1 taken along line VI-VI.
Figure 7:
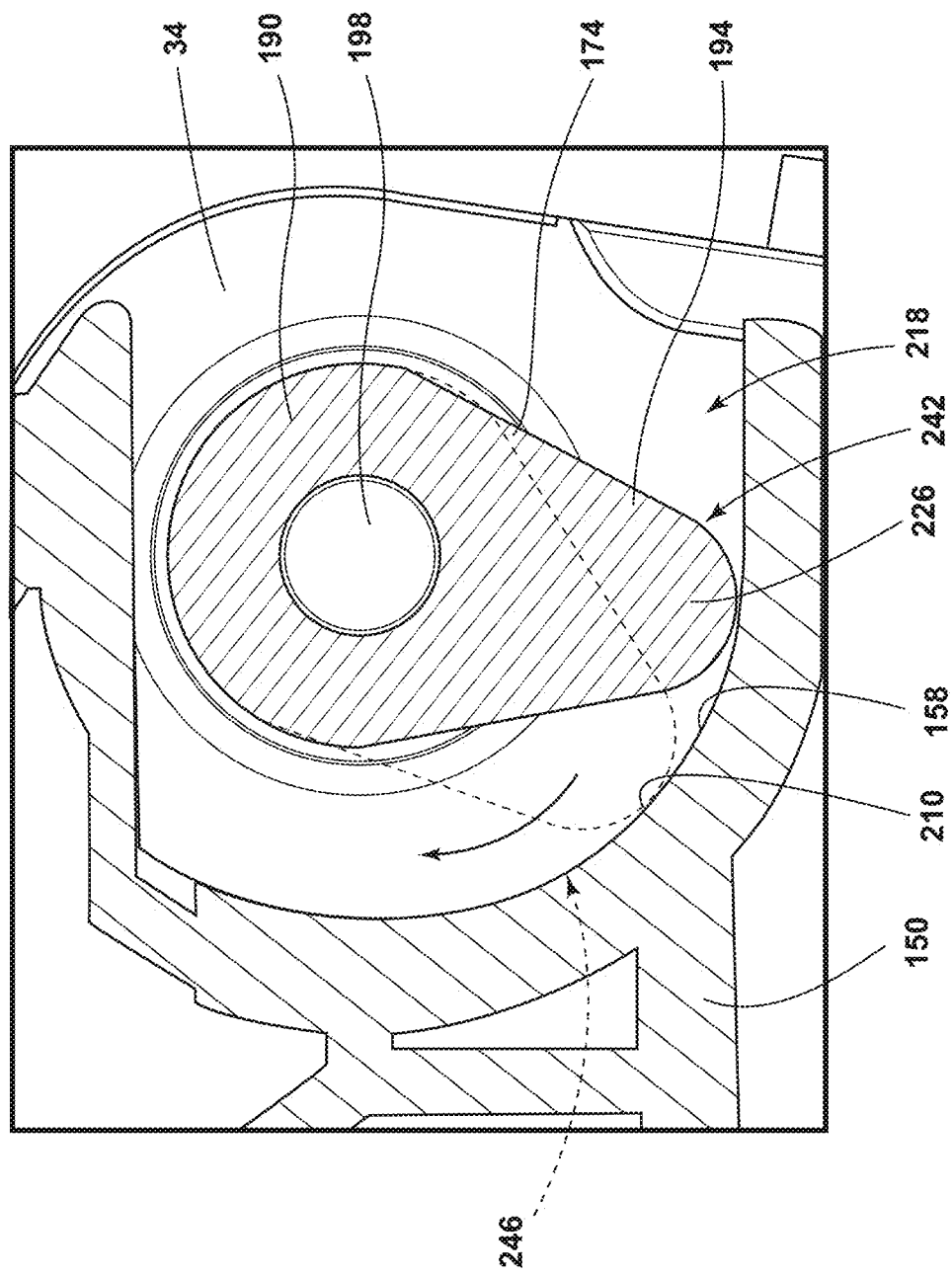
FIG. 7 is an enlarged view of an engagement member within a cutout of FIG. 6, taken at area VII.

Referring to FIGS. 6 and 7, when the lid 30 is in the lowered position 46, the first engagement member 174 may be spaced-apart from the first contact surface 210 of the first cutout 158. The second engagement member 182 may be configured similarly as the first engagement member 174, and may also be configured to operate in a similar manner with the second contact surface 214. According to various aspects, when the lid 30 is in the lowered position 46, the first engagement member 174 may be in the disengaged position 218. As illustrated in FIGS. 6 and 7, the first engagement member 174 may extend downwards away from the lid 30. According to various aspects, when the first engagement member 174 is disposed in the disengaged position 218, the first engagement member 174 may not provide the frictional interference with the first contact surface 210.

Figure 8:
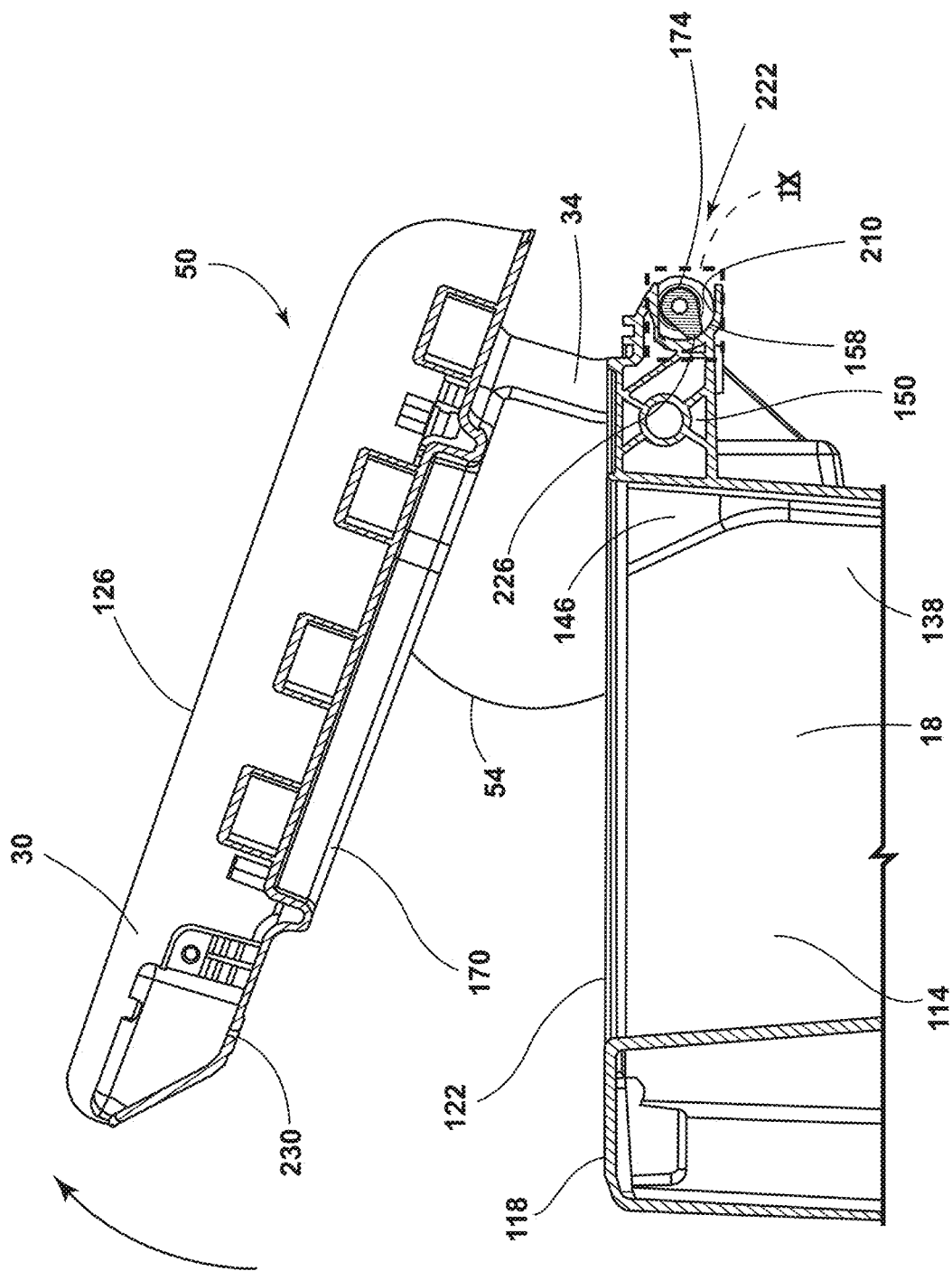
FIG. 8 is a cross-sectional view of a console assembly with a lid in an intermediate engaging position of FIG. 1 taken along line VI-VI.
Figure 9:
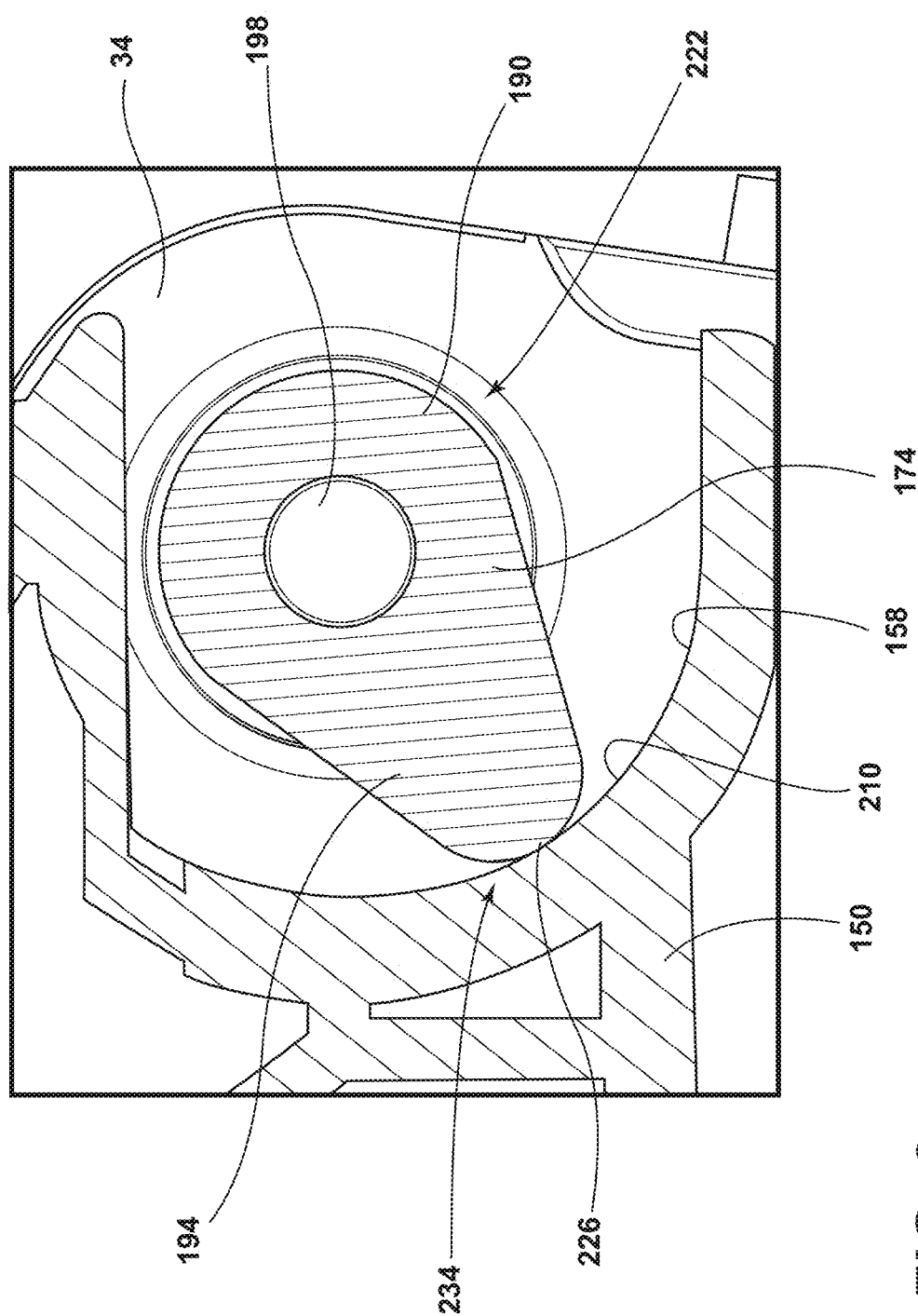
FIG. 9 is an enlarged view of a protrusion within a cutout of FIG. 8, taken at area IX.

Referring to FIGS. 8 and 9, the lid 30 is illustrated in the intermediate engaging position 50 and the first engagement member 174 is illustrated in the engaged position 222. The second engagement member 182 may be similarly configured and may operate in a similar manner. When the lid 30 is in the intermediate engaging position 50, the lid 30 is positioned at the predefined opening angle 54 defined between the lower surface 170 of the lid 30 and the upper rim 118 of the body 18. The intermediate engaging position 50 may be any position between the raised position 42 and the lowered position 46. The intermediate engaging position 50 may correspond with an initial contact between the first engagement member 174 and the first contact surface 210, as the lid 30 moves from the lowered position 46 to the raised position 42. In this way, the intermediate engaging position 50 may correspond with a start of the frictional interference between the first engagement member 174 and the first contact surface 210. Additionally or alternatively, when the lid 30 is in the intermediate engaging position 50, the first engagement member 174 may extend at an oblique orientation between a substantially vertical axis (e.g., a y-axis) and a substantially horizontal axis (e.g., an x-axis) defined by the hole 198 of the first engagement member 174.

Figure 11:
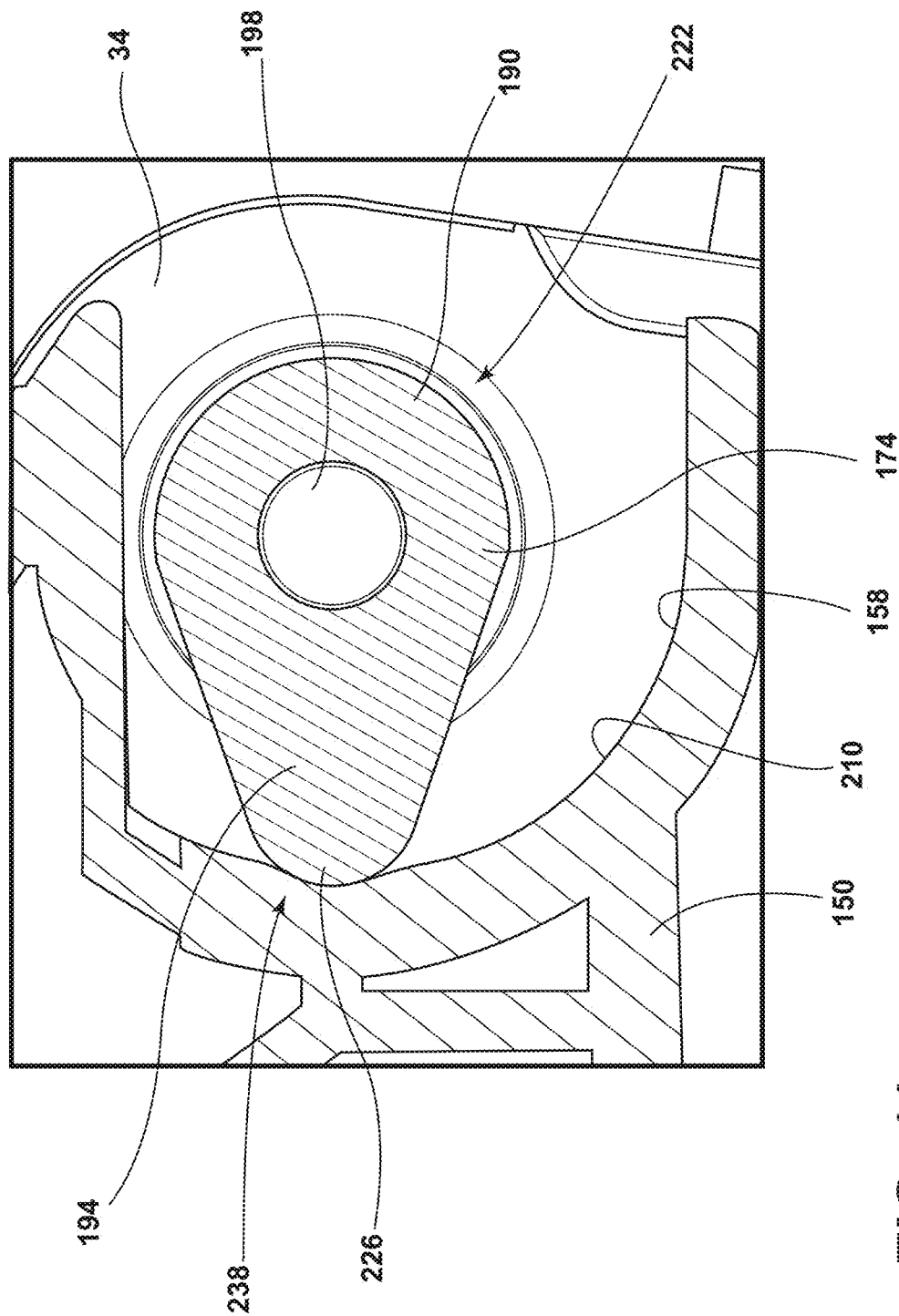
FIG. 11 is an enlarged view of a protrusion within a cutout of FIG. 10, taken at area XI.

Referring to FIGS. 10 and 11, the lid 30 is illustrated in the raised position 42 and the first engagement member 174 is illustrated in the engaged position 222. The second engagement member 182 may be similarly configured and may operate in a similar manner. When in the raised position 42, the lid 30 may extend substantially vertical relative to the upper rim 118 of the body 18. Moreover, when the lid 30 is in the raised position 42, the occupant may access the inner cavity 114 defined by the body 18. As the lid 30 rotates of the raised position 42, the connector 34 may correspondingly rotate, which may rotate the first engagement member 174. As illustrated, the first engagement member 174 may extend substantially horizontal in a vehicle-forward direction, when in the engaged position 222, when the lid 30 is in the raised position 42. The distal end 226 of the first engagement member 174 may engage the first contact surface 210 when in the engaged position 222.

Referring again to FIGS. 6-11, the first and second engagement members 174, 182 may slidably engage the first and second contact surfaces 210, 214 when the lid 30 rotates between the predefined opening angle 54 of the intermediate engaging position 50 and the raised position 42, the sliding engagement may produce the frictional interference. Stated differently, the first and second engagement members 174, 182 may engage the first and second contact surfaces 210, 214 when the lid 30 is in the intermediate engaging position 50. Moreover, the first and second engagement members 174, 182 may be in the engaged position 222 as the lid 30 rotates between the predefined opening angle 54 (e.g., intermediate engaging position 50) and the raised position 42. The frictional engagement between the first and second engagement members 174, 182 and the first and second contact surfaces 210, 214 may counteract the biasing force of the biasing member 58 as the lid 30 rotates to the raised position 42.

Additionally or alternatively, the first and second engagement members 174, 182 may be operable between the first engaged position 234 when the lid 30 is in the intermediate engaging position 50 and the second engaged position 238, when the lid 30 is in the raised position 42. In this way, the second engaged position 238 of the first and second engagement members 174, 182 may correspond with more than one position of the lid 30 (e.g., positions between the intermediate engaging position 50 and the raised position 42).

The distal ends 226 of the first and second engagement members 174, 182 may be spaced-apart from the first and second contact surfaces 210, 214 when the lid 30 is in the lowered position 46. In this way, the first and second engagement members 174, 182 may be in the disengaged position 218, when the lid 30 is in the lowered position 46. The first and second engagement members 174, 182 may be in the disengaged position 218 when the lid 30 rotates between the lowered position 46 to proximate the intermediate engaging position 50. Stated differently, the first and second engagement members 174, 182 may be spaced-apart from the first and second contact surfaces 210, 214 as the lid 30 rotates between the lowered position 46 to proximate the predefined opening angle 54.

Additionally or alternatively, the first and second engagement members 174, 182 may be operable between a first disengaged position 242 and when the lid 30 is in the lowered position 46 and a second disengaged position 246 and the lid 30 is proximate to the intermediate engaging position 50. In this way, the disengaged position 218 of the first and second engagement members 174, 182 may correspond to the plurality of positions of the lid 30 (e.g., positions between the lowered position 46 and the intermediate engaging position 50).

Referring still to FIGS. 6-11, as the lid 30 reaches the predefined opening angle 54, the first and second engagement members 174, 182 may engage the first and second contact surfaces 210, 214 to be in the engaged position 222. In this way, the first and second engagement members 174, 182 may remain in the disengaged position 218 between the lowered position 46 of the lid 30 and proximate the intermediate engaging position 50. Similarly, the first and second engagement members 174, 182 may remain in the engaged position 222 between the intermediate engaging position 50 of the lid 30 (e.g., when the lid 30 reaches the predefined opening angle 54) and the raised position 42. Stated differently, the first and second engagement members 174, 182 may be operable between the disengaged position 218 and the engaged position 222, which correspond with the lowered position 46 of the lid 30 and the raised position 42 of the lid 30.

Figure 12:
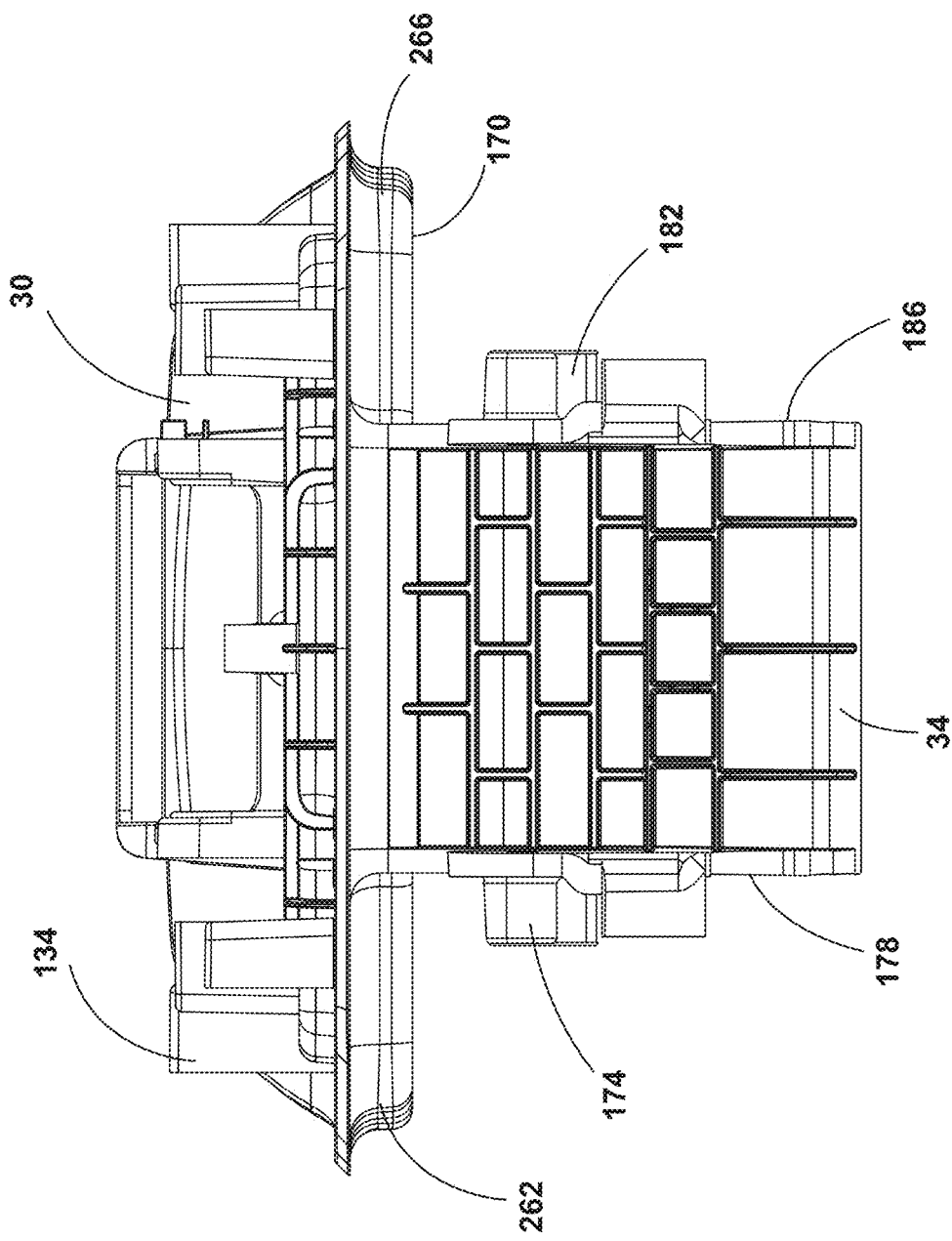
FIG. 12 is a rear plan view of a lid of a console assembly with a connector, according to one example.

Referring to FIG. 12, the connector 34 may extend from the lower surface 170 of the first portion 134 of the lid 30. The connector 34 may extend between the first and second engagement members 174, 182. In this way, the first and second outer surfaces 178, 186 may be opposing surfaces of a same connector 34. This configuration of the connector 34 may be advantageous for extending the cover 126 over an end 250 (FIG. 1) of the console assembly 10. The extended cover 126 may be advantageous for increasing the aesthetics of the console assembly 10. The extended cover 126 may provide additional padded layers, cushion layers, and/or decorative layers on the console assembly 10.

Figure 13:
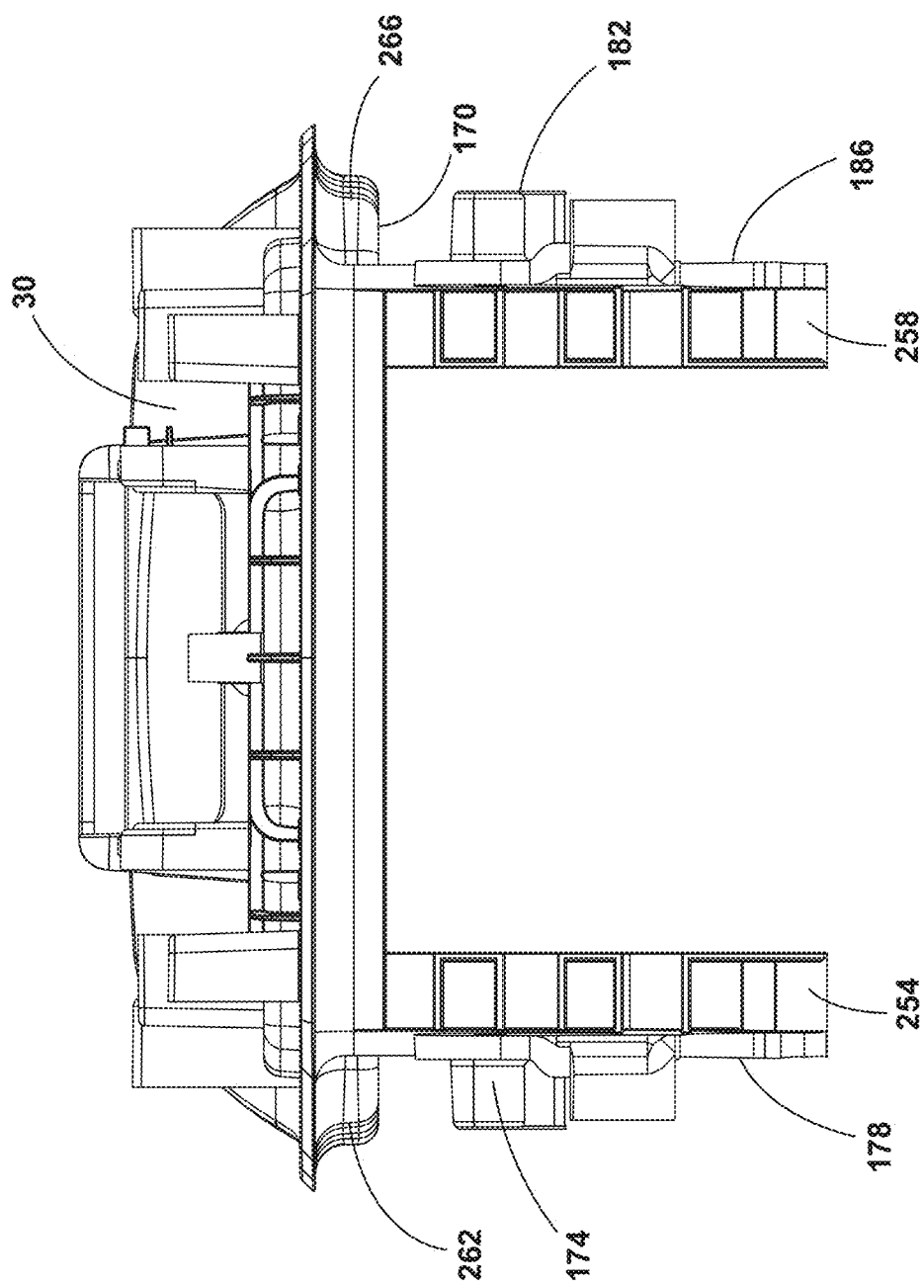
FIG. 13 is a rear plan view of a lid for a console assembly with a first connector and a second connector, according to one example

Referring to FIG. 13, the lid 30 may include a first connector 254 and a second connector 258. In various examples, the first engagement member 174 may extend from the first connector 254 and the second engagement member 182 may extend from the second connector 258. According to various aspects, the first and second connectors 254, 258 may extend from the lower surface 170 of the first portion 134 of the lid 30. Additionally or alternatively, the first connector 254 may extend from a first side 262 of the lid 30 and the second connector 258 may extend from a second side 266 of the lid 30. The first and second connectors 254, 258 may be space-apart from one another and may extend substantially parallel to one another. This configuration of the lid 30 may be advantageous for providing additional space proximate the end 250 of the console assembly 10. The additional space may be advantageous for increased storage for the occupants of the vehicle 14. The additional space may also be advantageous for including additional cup wells 102 proximate the end 250 of the console assembly 10, which may be accessible to occupants within the second seating row 82.

Use of the presently disclosed device may provide for a variety of advantages. For example, the frictional engagement between the first and second engagement members 174, 182 of the lid 30 with the first and second contact surfaces 210, 214 of the body 18 may reduce the biasing force of the biasing member 58. In a non-limiting example where the biasing member 58 is a spring, the first and second engagement members 174, 182 may reduce the spring torque of the spring, which may reduce bouncing and/or rebounding effects of the lid 30 rotating to the raised position 42. Additionally, the lid 30 with the first and second engagement members 174, 182 may decrease manufacturing and production costs. Further, the lid 30 may reduce the number of components within the console assembly 10. Further, the frictional engagement between the first and second engagement members 174, 182 and the first and second contact surfaces 210, 214 may reduce noise, which can be caused by the the lid 30 reaching the raised position 42. Also, the first and second connectors 254, 258 of the lid 30 may provide space for additional cup wells 102 in the console assembly 10 accessible by occupants in the second seating row 82 of the vehicle. 14. Additional benefits or advantages of using this device may also be realized and/or achieved.

According to various examples, a vehicle console assembly includes a body that defines a cutout. The cutout includes a context surface. A lid is operably coupled to the body and includes a connector that defines an engagement member. The lid is operable between a raised position, a lowered position, and an intermediate engaging position therebetween defined by a predefined opening angle. The engagement members space-apart from the context surface when the lid is in the lowered position and engages the context surface and the lid is in the intermediate engaging position. A biasing members disposed proximate the connector. A hinge pin extends through the cutout, the biasing member, and the engagement member. Embodiments of the present disclosure may include one or a combination of the following features:

- an engagement member is in a disengaged position when a lid rotates between a lowered position and an intermediate engaging position;
- an engagement member is in an engaged position when a lid rotates between a predefined opening angle and a raised position;
- an engagement member defines a teardrop cross-sectional shape;
- a biasing member biases the lid toward a raised position. An engagement member frictionally engages a context surface when a lid rotates to a raised position;
- an engagement member is operable between a first engaged position when the lid is in an intermediate engaging position and a second engage position when the lid is in a raised position; and
- an engagement member is operable between a first disengaged position when a lid is in a lowered position and a second and disengaged position. When the lid is proximate and intermediate engaging position.

According to various examples, a console assembly for a vehicle includes a body. The body includes a support extension that extends outward from an upper portion of the body. The support extension defines a cutout that has a contact surface. A lid includes an engagement member positioned within the cutout. The engagement member is operable between an engaged position and a disengaged position. A hinge pin is operably coupled to the body and the lid. The lid rotates about the hinge pin and is operable between a raised position, a lowered position, and an intermediate engaging positioned therebetween. Embodiments of the present disclosure may include one or a combination of the following features:
- a lid is positioned at a predefined opening angle when the lid is in an intermediate engaging position;
- an engagement member is in an engaged position and slidably engages a contact surface when the lid rotates between an intermediate engaging position and a raised position;
- an engagement member is in a disengaged position when a distal end of the engagement member is spaced-apart from a context surface. The engagement member is in a disengaged position when a lid rotates between a lowered position and an intermediate engaging position;
- an engagement member frictionally engages a context surface when a lid rotates between an intermediate engaging position and a raised position;
- an engagement member is in a disengaged position when a lid rotates between a lowered position and an intermediate engaging position. The engagement member is in an engaged position when the lid rotates between a predefined opening angle and a raised position;
- a biasing member is operably coupled to a hinge pin. The biasing member biases a lid toward a raised position; and
- an engagement member is defined by a first portion having a first radius and a second portion having a second radius. A ratio between the first radius and the second radius is about 2:1.

According to various examples, a console assembly includes a body that includes a first support extension defines a first cutout on a first inner surface thereof and a second support extension that defines a second cutout on the second inner surface thereof. The first cutout includes a first contact surface and the second cutout includes a second contact surface. A lid includes at least one connector that extends from a lower surface of a lid. The at least one connector defines a first engagement member on a first outer surface thereof and a second engagement member and a second outer surface thereof. The first and second engagement members are positioned within the first and second cutouts and configured to engage the first and second context surface, respectively. Embodiments of the present disclosure may include one or a combination of the following features:
- a lid is operable between a raised position, lowered position, and an intermediate engaging position. The lid is positioned at a predefined opening angle when in the intermediate engaging position;
- first and second engagement members engage first and second contact surfaces when a lid is positioned at a predefined opening angle. The first and second engagement members slidably engage the first and second contact surfaces when the lid rotates between the predefined opening angle and a raised position;
- at least one connector includes a first connector that includes a first engagement member and a second connector that includes a second engagement member; and
- a distal end of each of first and second engagement members are spaced-apart from first and second contact surfaces when a lid is in a lowered position.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle console assembly, comprising:
   a body defining a cutout, wherein the cutout includes a contact surface;
   a lid operably coupled to the body and including a connector defining an engagement member that has a teardrop cross-sectional shape, wherein the lid is operable between a raised position, a lowered position, and an intermediate engaging position therebetween defined by a predefined opening angle, and wherein the engagement member is spaced-apart from the contact surface when the lid is in the lowered position and engages the contact surface when the lid is in the intermediate engaging position;
   a biasing member disposed proximate the connector; and
   a hinge pin extending through the cutout, the biasing member, and the engagement member.

2. The vehicle console assembly of claim 1, wherein the engagement member is in a disengaged position when the lid rotates between the lowered position and the intermediate engaging position.

3. The vehicle console assembly of claim 1, wherein the engagement member is in an engaged position when the lid rotates between the predefined opening angle and the raised position.

4. The vehicle console assembly of claim 1, wherein the biasing member biases the lid toward the raised position, and wherein the engagement member frictionally engages the contact surface when the lid rotates to the raised position.

5. The vehicle console assembly of claim 1, wherein the engagement member is operable between a first engaged position when the lid is in the intermediate engaging position and a second engaged position when the lid is in the raised position.

6. The vehicle console assembly of claim 5, wherein the engagement member is operable between a first disengaged position when the lid is in the lowered position and a second disengaged position when the lid proximate the intermediate engaging position.

7. A console assembly for a vehicle, comprising:
   a body, wherein the body includes a support extension extending outward from an upper portion of the body, and wherein the support extension defines a cutout having a contact surface;
   a lid including an engagement member positioned within the cutout, wherein the engagement member is operable between an engaged position and a disengaged position, wherein the engagement member includes a first portion having a first radius and a second portion having a second radius, the ratio between the first radius and the second radius being about 2:1; and
   a hinge pin operably coupled to the body and the lid, wherein the lid rotates about the hinge pin and is operable between a raised position, a lowered position, and an intermediate engaging position therebetween.

8. The console assembly of claim 7, wherein the lid is positioned at a predefined opening angle when the lid is in the intermediate engaging position.

9. The console assembly of claim 7, wherein the engagement member is in the engaged position and slidably engages the contact surface when the lid rotates between the intermediate engaging position and the raised position.

10. The console assembly of claim 7, wherein the engagement member is in the disengaged position when a distal end of the engagement member is spaced-apart from the contact surface, and wherein the engagement member is in the disengaged position when the lid rotates between the lowered position and the intermediate engaging position.

11. The console assembly of claim 7, wherein the engagement member frictionally engages the contact surface when the lid rotates between the intermediate engaging position and the raised position.

12. The console assembly of claim 7, wherein the engagement member is in the disengaged position when the lid rotates between the lowered position and the intermediate engaging position, and wherein the engagement member is in the engaged position when the lid rotates between the intermediate engaging position and the raised position.

13. The console assembly of claim 7, further comprising:
    a biasing member operably coupled to the hinge pin, wherein the biasing member biases the lid toward the raised position.

14. A console assembly, comprising:
    a body including a first support extension defining a first cutout on a first inner surface thereof and a second support extension defining a second cutout on a second inner surface thereof, wherein the first cutout includes a first contact surface and the second cutout includes a second contact surface; and
    a lid including at least one connector extending from a lower surface of the lid, wherein the at least one connector defines a first engagement member on a first outer surface thereof and a second engagement member on a second outer surface thereof, wherein the first and second engagement members are positioned within the first and second cutouts and configured to engage the first and second contact surfaces, respectively, and wherein each of the first and second engagement members defines a teardrop shape.

15. The console assembly of claim 14, wherein the lid is operable between a raised position, a lowered position, and an intermediate engaging position, and wherein the lid is positioned at a predefined opening angle when in the intermediate engaging position.

16. The console assembly of claim 15, wherein the first and second engagement members engage the first and second contact surfaces when the lid is positioned at the predefined opening angle, and wherein the first and second engagement members slidably engage the first and second contact surfaces when the lid rotates between the predefined opening angle and the raised position.

17. The console assembly of claim 14, wherein the at least one connector includes a first connector including the first engagement member and a second connector including the second engagement member.

18. The console assembly of claim 14, wherein a distal end of each of the first and second engagement members are spaced-apart from the first and second contact surfaces when the lid is in a lowered position.

* * * * *